United States Patent [19]

Lee, Jr.

[11] Patent Number: 4,792,492

[45] Date of Patent: Dec. 20, 1988

[54] ABSORPTION OF ADDITIVIES INTO POLYMER SURFACES FROM SOLUTION

[75] Inventor: Gim F. Lee, Jr., Albany, N.Y.

[73] Assignee: General Electric Company, Selkirk, N.Y.

[21] Appl. No.: 80,625

[22] Filed: Jul. 31, 1987

Related U.S. Application Data

[63] Continuation of Ser. No. 520,241, Aug. 4, 1983, abandoned.

[51] Int. Cl.$^4$ .......................... B32B 9/04; B05D 3/02
[52] U.S. Cl. ............................. 428/411.1; 427/393.5; 427/430.1; 428/412; 428/474.4; 428/480; 428/521; 428/522; 428/523
[58] Field of Search ......................... 427/393.5, 430.1; 428/412, 411.1, 474.4, 480, 521, 522, 523

[56] References Cited

U.S. PATENT DOCUMENTS 4,037,004 7/1977 Nakano et al. ................. 427/307 X
4,281,034 7/1981 Narayan .............................. 427/191

Primary Examiner—Thurman K. Page
Attorney, Agent, or Firm—Hedman, Gibson, Costigan & Hoare

[57] ABSTRACT

Polymeric articles or non-polymeric articles having polymeric coatings are treated to incorporate an additive in the surface by a process comprising contacting the surface with a solution of the additive in a mixture of two or more solvents of different solvating power and selectively absorbing the additive into the surface.

24 Claims, No Drawings

ABSORPTION OF ADDITIVIES INTO POLYMER SURFACES FROM SOLUTION

This is a continuation of application Ser. No. 520,241, filed Aug. 4, 1983, now abandoned.

BACKGROUND OF THE INVENTION

Polymeric materials have enjoyed increasingly wider use in industrial and consumer products, replacing or supplementing other materials such as metals, wood and ceramiss. Chemical additives are often employed with the polymer to adapt the physical or chemical properties for particular needs. Thus, depending on requirements, it may be desirable to add one or more substances such as heat stabilizers, ultraviolet light stabilizers, antistatic agents, colorants, electrically conductive materials, flame retardant agents, smoke suppressants, foaming agents, and others. Incorporation of the additive may be accomplished by use of various methods, including dry, solution or melt blending with the polymer prior to or during thermal processing into the finished article. In some instances, the additive is merely coated onto the surface of the polymeric artccle, as in the case of certain antistatic agents which dissipate static charges or light stabilizers which absorb ultraviolet radiation.

In one prior art procedure for incorporating an ultraviolet light stabilizer into the surface of a molded polyphenylene ether resin blend, the stabilizer is dissolved in a solvent, the molded piece is immersed in the solution, and the stabilizer is absorbed into the molded surface. A disadvantage of this procedure is that the solvent aggressively attacks the polymer surface, making it tacky when wet, and thus difficult to handle until the surface is thoroughly dried.

INTRODUCTION TO THE INVENTION

The present invention comprises in one aspect, a novel method for incorporating an additive from solution into a polymer surface, making use of a miscible blend of at least two liquids, one of which is a relatively good solvent for the polymer and additive, the other of which is a poorer solvent or nonsolvent for the polymer. Upon contacting the polymer with the liquid blend, the additive is readily absorbed, yet the surface does not become tacky. A result is that the workpiece can be more easily handled immediately after treatment.

The method of this invention can be utilized to add various additives to pre-formed polymeric articles or to non-polymeric articles having a polymeric coating or surfacing. Conditions can be regulated to increase or decrease the amount of additive incorporated, as will be explained in greater detail.

Another facet of the invention comprises articles which have been treated in accordance with the aforementioned method.

DESCRIPTION OF THE INVENTION

In general, the process of the invention comprises the steps of (a) contacting an article comprising a polymeric surface with a solution of an additive for the polymer in a miscible blend of two or more liquids, at least one of which is a solvent for the polymer and at least one of which is a relatively poorer solvent, or nonsolvent, for the polymer;

(b) maintaining the contacting for a period sufficient to absorb an effective amount of the additive into the polymeric surface; and (c) drying the liquid blend from the surface to obtain an article having the additive incorporated within.

By way of illustration, the additive or additives with which the polymer surface is to be treated is (are) first dissolved in a blend of two or more liquids as described above. The amount of additives can be varied as described to prepare a dilute, medium strength or concentrated solution. Preferably, however, the additive is dissolved in amounts near or at the limit of solubility, so as to provide a longer lasting solution which has less need for replenishment as more of the additive is absorbed into the polymer surface.

Examples of additives which may be employed are ultraviolet light stabilizers, heat stabilizers, antioxidants, colorants (for example, pigments or dyes), antistatic agents, flame retardant agents, smoke suppressants, foaming agents, electrical conductivity agents, lubricants and abrasion resistants.

After the solution of the additive has been prepared, the polymeric article is immersed in it. Any suitable container may be used for this purpose, including glass lined or stainless steel vessels. Immersion times vary from several seconds to several minutes or more, depending on a number of factors, including the nature of the polymer surface, the type of additive, the amount of additive to the incorporated and the composition of the solvent blend. Generally, the time period required for treatment can be shortened by use of a stronger solvent or solvents in the blend, or by the use of a higher ratio of better solvent to poorer solvent, either of which will facilitate absorption of the additive int the surface. Conversely, longer treatment times are required with use of weaker solvents or a lower ratio of better solvent to poorer solvent in the blend.

Absorption of the additive may also be facilitated by heating the solvent blend shortly prior to or during contacting with the polymer surface. Heating at elevated temperatures above room temperature e.g., above 23° C., and up to the boiling point of the blend is possible, but care should be taken not to greatly exceed that temperature if an open container is used, otherwise undesirable large amounts of the solvents may be lost to the atmosphere through volatilization.

After the immession has been completed, the surface or surfaces of the article are dried to remove the solvent. Drying may be accomplished, for example, by permitting the article to stand at room temperature, or by blowing air across the wet surface, or by heating in an enclosure, such as an oven.

The method which has been described is useful to incorporate additives into the surface of a broad spectrum of polymeric materials, including those of poly(alkenyl aromatics), for example, polystyrene; polyvinyl chlorides; polyamides; polyesters, for example, poly(alkylene terephthalates) such as polyethylene terephthalate and polybutylene terephthalate; polyurethanes (both polyester- and polyether-based); polycarbonatss; polyolefins; polyphenylene oxides (or ethers); polyacrylics; acrylonitrile-butadienestyrene terpolymers (ABS); and so forth.

Special mention is made of polyphenylene oxide resin, and especially of homopolymers and copolymers made up of units of the formula

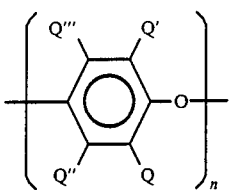

in which Q, Q', Q" and Q'" are, independently, selected from among hydrogen, halogen, hydrocarbon, halohydrocarbon, hydrocarbonoxy, and halohyrocarbonoxy; and n represents the toal number of monomer units and is an integer of at least about 20, and more usually at least 50.

These can be prepared using known procedures, including those described by Hay in U.S. Pat. Nos. 3,306,874 and 3,306,875, and by Stamatoff in U.S. Pat. Nos. 3,257,357 and 3,257,358, incorporated herein by reference, from the reaction of phenols including but not limited to: 2,6-dimethylphenol; 2,6-diethylphenol; 2,6-dibutylphenol; 2,6-dilaurylphenol; 2,6-dipropylphenol; 2,6-diphenyphenol, 2-methyl-6-ethylphenol; 2-methyl-6-cyclohexylphenol; 2-methyl-6-tolylphenol; 2-methyl-6-methoxyphenol; 2-methyl-6-butylphenol; 2,6-dimathoxyphenol, 2,3,6-trimethylphenol; 2,3,5,6-tetramethylphenol; and 2,6-diethoxyphenol.

Examples of some of the polymers which can thus be prepared are poly(2,6-dimethyl-1,4-phenylene ether), poly(2,6-diethyl-1,4-phenylene ether), poly (2,6-dibutyl-1,4-phenylene ether), poly(2,6-dilauryl-1,4-phenylene ether), poly(2,6-dipropyl-1,4-phenylene ether), poly(2,6-diphenyl-1,4-phenylene ether), poly (2-methyl-6-ethyl-1,4-phenylene ether), poly(2-methyl6-cyclohexyl-1,4-phenylene ether), poly(2-methyl-6-tolyl-1,4-phenylene ether), poly(2-methyl-6-methoxy-1,4-phenylene ether), poly(2,6-dimethoxy-1,4-phenylene ether), poly (2,3,6-trimethyl-1,4-phenylene ether), poly(2,3,5,6- tetramethyl-1,4-phenylene ether), and poly(2,6-diethoxy-1,4-phenylene ether). Also useful are copolymers prepared from mixtures of the aforementioned phenols, such as 2,6-dimethylphenol employed in conjunction with, for instance, 2,3,6-trimethylphenol or 2-methyl-6-butylphenol, to provide, for instance, poly(2,6-dimethylco-2,3,6-trimethyl-1,4-phenylene ether).

Most preferred are polymers within the above formula where Q and Q' are alkyl having from 1 to 4 carbon atoms, and especially poly(2,6-dimethyl-1,4phenylene ether).

These resins can be used in combination with other polymeric materials such as rubber modified high impact polystyrene (HIPS) or impact modifying styrene co- and terpolymers, or still others, to form compositions which are extrudable or moldable into various shaped objects or coatings suitable for treatment in accordance with the process of this invention.

After treatment in accordance with this invention, the polymeric surface can be evaluated to determine the extent of additive absorption by use of any number of conventional testing procedures. With particular reference to ultraviolet light stabilizers, for instance, this can take the form of exposing the treated surface to sunshine or artificial weathering devices, followed by measuring the degree of polymer degradation by monitoring the change in tensile strength, carbonyl development, or, as shown in the working examples, yellowness index.

DESCRIPTION OF THE SPECIFIC EMBODIMENTS

The process and articles in accordance with the invention are illustrated by the following examples.

EXAMPLE 1

A thermoplastic blend of 50 parts by weight of poly(2,6-dimethyl-1,4-phenylene ether) resin (PPO®, General Electric Company), 50 parts by weight, rubber modified high impact polystyrene (HIPS), 3 parts by weight of titanium dioxide, 0.15 part by weight of zinc oxide and 0.15 part by weight of zinc sulfide was prepared, extruded at 530° F., and injection molded into test pieces at a barrel temperature of 500° F. (170° F. mold temperature).

The test pieces were then treated in accordance with the invention by immersion in a solution of 2-hydroxy-4-octyloxybenzophenone (American Cyanamid's Cyasorb UV 531® light stabilizer) in 1:1 chloroform (boiling point=61.3° C.): methanol (boiling point=64.7° C.), using the immersion times and stabilizer concentrations shown below. After treatment, the test pieces were directly exposed to fluorescent black light for up to 20 days time, with the color change (the initial pieces were white) being measured after 2, 8 and 20 days, respectively (shown below as yellowness index).

| | Test # | | | |
|---|---|---|---|---|
| | Stabilizer Conc.* | | | |
| Imm. Time | 0 | 1 | 5 | 10 |
| 0 sec | #1 | | | |
| 10 sec | #2 | #4 | #6 | #8 |
| 30 sec | #3 | #5 | #7 | #9 |

| | Yellowness Index | | | | Change in Yellowness Index | | | |
|---|---|---|---|---|---|---|---|---|
| Time of UV Exposure; (none after initial immersion) | 27.9 | | | | 0 | | | |
| | 27.4 | 27.0 | 27.4 | 27.3 | −0.5 | −0.9 | −0.5 | −0.6 |
| | 27.0 | 27.6 | 28.2 | 27.1 | −0.9 | −0.3 | 0.3 | −0.8 |
| 2 days of UV exposure | 26.7 | | | | −1.2 | | | |
| | 26.8 | 26.2 | 25.7 | 25.3 | −1.1 | −1.7 | −2.2 | −2.6 |
| | 26.6 | 25.7 | 26.0 | 25.6 | −1.3 | −2.2 | −1.9 | −2.3 |
| 8 days of UV exposure | 30.8 | | | | 2.9 | | | |
| | 30.9 | 28.3 | 27.0 | 26.4 | 3.0 | 0.4 | −0.9 | −1.5 |
| | 32.6 | 27.7 | 27.1 | 25.9 | 4.7 | −0.2 | −0.8 | −3.0 |
| 20 days of UV exposure | 42.6 | | | | 14.7 | | | |
| | 41.9 | 33.2 | 30.0 | 28.5 | 14.0 | 5.3 | 2.1 | 0.6 |
| | 45.3 | 33.4 | 30.6 | 26.9 | 17.4 | 5.3 | 2.7 | −1.0 |

*Grams of UV531 per 100 grams of 1:1 chloroform:methanol

EXAMPLE 2

This example also illustrates a method of treatment in accordance with the invention, but using Cyasorb 531® light stabilizer in a different solvent blend than Example 1.

Injection molded test pieces in the shape of 4 inch diameter discs were prepared from a thermoplastic blend of 45 parts by weight of poly(2,6-dimethyl-1,4-phenylene ether) resin (PPO), 55 parts by weight of rubber modified high impact polystyrene, 13 parts by weight of isopropylated triphenyl phosphate (FMC's Kronitex 50), 0.5 part by weight of tridecyl phosphite 1.5 parts by weight of polyethylene, 0.15 parts by weight of zinc oxide and 0.15 parts by weight of zinc sulfide.

The solvent blend was a 4:1 mixture of trichlorotrifluoroethane (Freon 113) (boiling point=45.8°-47.7° C.: methylene chloride (boiling point=41° C.). A portion was used to prepare a 5% by weight solution of Cyasorb 531. One test disc was not immersed at all. A second disc was immersed in the solvent blend (no additive present) at room temperature (about 23° C.). A third was immersed in the blend at the boiling point of the solvent blend. A fourth was immersed in the 5% solution at room temperature. The fifth was immersed in the 5% solution at the boiling point. Immersion time was 5 seconds in every case.

The test discs were then exposed to ultraviolet light radiation in a Hewlett-Packard HPUV Tester. The amount of irradiance was 60,000 mW/cm. The temperature was kept constant at 35° C. The relative humidity was 50%. Test discs were rotated every other day to assure uniform exposure. The results were as follows:

TABLE 2

TIME TO CHANGE IN YELLOWNESS INDEX OF 1.0

| Test Sample | Time (hours) |
|---|---|
| 1. Control (no immersion) | 40.0 |
| 2. Immersion Room Temp., No Additive | 17.9 |
| 3. Immersion Boiling Point, No Additive | 23.8 |
| 4. Immersion 5% Solution, Room Temp. | greater than 405 |
| 5. Immersion 5% Solution, Boiling Point | greater than 405 |

As shown, the exposure time required for the test samples to exhibit a color change of ΔYI =1 was greatly increased by treatment with the 5% solution of Cyasorb 531 ® stabilizer in both cases.

EXAMPLE 3

This example illustrates the use of a solution of 5% by weight of a 1:1 mixture of Cyasorb 531 add bis (2,2,6,6-tetramethyl-4-piperidinyl) sebacate (Tinuvin 770) dissolved in a 4:1 blend of Freon 113 (boiling point-45.-8°-47.7° C.) and methylene chloride boiling (point=41° C.).

Test discs of the same composition and physical dimensions as in the previous example were immersed in the solution for 5 seconds, in one case at room temperature, in another case at the boiling point. Exposure to ultraviolet light radiation was in a Hewlett-Packard HPUV Tester, again using the same conditions as in Example 2. The yellowness index and change in yellowness index for each test sample, at various time intervals, is reported below.

TABLE 3

| Sample | 5 sec. R.T YI | ΔYI | 5 sec. B.P. YI | ΔYI |
|---|---|---|---|---|
| Exposure Time, hours | | | | |
| 0.0 | 15.8 | 0 | 21.1 | 0 |
| 23.0 | 14.4 | −1.4 | 19.4 | −1.7 |
| 50.8 | 14.4 | −1.4 | 19.3 | −1.8 |
| 137.7 | 14.4 | −1.4 | 19.3 | −1.8 |
| 208.5 | 14.6 | −1.2 | 19.5 | −1.6 |
| 300.7 | 14.8 | −1.0 | 19.6 | −1.4 |

TABLE 3-continued

| Sample | 5 sec. R.T YI | ΔYI | 5 sec. B.P. YI | ΔYI |
|---|---|---|---|---|
| 375.2 | 14.9 | −0.9 | 19.6 | −1.4 |
| 405.4 | 15.0 | −0.8 | 19.8 | −1.3 |

EXAMPLE 4

The procedure of Example 3 was repeated, except using a solution comprised of 5% by weight of Tinuvin 770 in a 4:1 blend of Freon 113 (boiling point =45.8°-47.7° C.) and methylene chloride (boiling point=41° C). The exposure time required to show a yellowness index change of 1.0 was 39.7 hours in the case of the test sample immersed for 5 seconds at room temperature, and 42.5 hours for the test sample immersed for 5 seconds at the boiling point of the solution.

All of the above mentioned patents and publications are incorporated herein by reference.

Other modifications and variations of the invention will occur to those skilled in the art in the light of the above disclosure. It is to be understood, therefore, that changes may be made in the specific embodiments which are within the scope of the invention defined in the appended claims.

I claim:

1. A process for incorporating an additive into the polymeric surface of a molded article comprising a polyphenylelne ether resin product, comprising the steps of:
   (a) contacting said article having at least one said polymeric surface with a solution of an additive dissolved in a miscible blend of two or more liquids, at least one of which is a solvent for the polyphenylene ether resin product and additive and at least oen of which is a nonsolvent or poorer solvent for the polyphenylene ether resin and additive;
   (b) continuing the contact for a period of time sufficient for the polyphenylene ether resin product surface to absorb an effective amount of the additive; and
   (c) drying the liquid from the polymer surface to obtain an article having the additive incorporated in the surface, wherein the additive is selected from among light stabilizers, heat stabilizers, antioxidants, colorants, antistatics agents, flame retardant agents, smoke suppressants, foaming agents, electrical conductivity additives, lubricants, and resistants and wherein the at least one solvent for the polyphenylene ether resin product has a boiling point which is lwoer than that of the at least one nonsolvent or poorer solvent for the polyphenylene ether resin and additive.

2. A process according to claim 1, in which in steps (a) and (b) the contacting is conducted at room temperature.

3. A process according to claim 1, in which in steps (a) and (b) the contacting is conducted at an elevated temperature above room temperature but below the boiling point of the additive solution.

4. A process according to claim 1, in which in steps (a) and (b) the contacting is conducted at or near the boiling point of the additive solution.

5. A process according to claim 1, in which contacting is effected by immersion.

6. A process according to claim 1, in which the additive is a light stabilizer.

7. A process according to claim 1, in which the polymer is a polyphenylene oxide resin.

8. A process according to claim 1, in which the polymer is a polyphenylene oxide homopolymer or copolymer having units of the formula

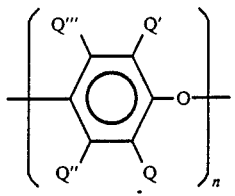

in which Q, Q', Q" and Q'" are, independently, selected from among hydrogen, halogen, hydrocarbon, halohydrocarbon, hydrocarbonoxy, and halohycrocarbonoxy; and n represents the total number of monomer units and is an integer of at least about 20.

9. A process according to claim 8, in which the polyphenylene ether resin is poly(2,6-dimethyl-1,4-phenylene ether).

10. A process according to claim 8, in which the polyphenylene ether resin is in admixture with a styrene polymer.

11. A process according to claim 10, in which the styrene polymer is rubber modified high impact polystyrene.

12. A process according to claim 1, in which the miscible blend comprises chloroform and methanol.

13. A process according to claim 1, in which the miscible blend comprises trichlorotrifluoroethane and methylene chloride.

14. A process according to claim 1, in which the additive is 2-hydroxy-4-octyloxybenzophenone, or bis (2,2,6,6-tetramethyl-4-piperidinyl) sebacate, or a mixture of both.

15. An article comprising a polymeric surface or surfaces having been treated by the process of claim 1.

16. An article comprising a polymeric surface or surfaces having been treated by the process of claim 6.

17. A process for incorporating an additive into the polymeric surface of an article, comprising
(a) contacting an article having at least one polymeric surface with a solution of an additive dissolved in a miscible blend of two or more liquids, at least one of which is a solvent for the polymer and additive, and at least one of which is a nonsolvent or poorer solvent;
(b) continuing the contact for a period of time sufficient for the polymer surface to absorb an effective amount of the additive; and
(c) drying the liquid from the polymer surface to obtain an article having the additive incorporated in the surface, wherein the at least one solvent for the polymer and additive has a higher evaporation rate than that of the at least one nonsolvent or poorer solvent.

18. An article comprising a polymeric surface or surfaces having been treated by the process of claim 11.

19. A process for incorporating an additive into the polymeric surface of a molded article comprising a polyphenylene ether resin product, comprising the steps of:
(a) contacting said article having at least one said polymeric surface with a solution of an additive dissolved in a miscible blend of two or more liquids, at least one of which is a solvent for the polyphenylene ether resin product and additive, and at least one of which is a nonsolvent or poorer solvent for the polyphenylene ether resin and additive;
(b) continuing the contact for a period of time sufficient for the polyphenylene ether resin product surface to absorb an effective amount of the additive; and
(c) drying the liquid from the polymer surface to obtain an article having the additive incorporated in the surface, wherein the additive is selected from among light stabilizers, heat stabilizers, antioxidants, colorants, antistatics agents, flame retardant agents, smoke suppressants, foaming agents, electrical conductivity additives, lubricants, and resistants and wherein the at least one solvent for the polyphenylene ether resin product has an evaporation rate which is higher than that of the at least one nonsolvent or poorer solvent for the polyphenylene ether resin and additive.

20. A process for incorporating an additive inot the polymeric surface of an article, comprising
(a) contacting an article having at least one polymeric surface with a solution of an additive dissolved in a miscible blend of two or more liquids, at least one of which is a solvent for the polymer and additive, and at least one of which is a nonsolvent or poorer solvent;
(b) continuing the contact for a period of time sufficient for the polymer surface to absorb an effective amount of the additive; and
(c) drying the liquid from the polymer surface to obtain an article having the additive incorporated in the surface, wherein the at least one solvent for the polymer and additive has a lower boiling point than that of the at least one nonsolvent or poorer solvent for the polymer.

21. An article comprising a polymeric surface of surfaces having been treated by the process of claim 20.

22. A prccess according to claim 20, in which the additive is selected form among light stabilizers, heat stabilizers, antioxidants, colorants, antistatic agents, flame retardant agents, smoke suppressants, foaming agents, electrical conductivity additives, lubricants, and abrasion resistants.

23. A process according to claim 20, in which the polymer is selected from among polyphenylene oxide resins, poly(alkenyl aromatic) resins, polyvinyl chlorides, polyamides, polyesters, polycarbonates, polyurethanes, polyolefins, polyacylics and acrylonitrile-butadiene-styrene terpolymers.

24. A article comprising a polymeric surface or surfaces having been treated by the process of claim 20.

* * * * *

UNITED STATES PATENT AND TRADEMARK OFFICE
CERTIFICATE OF CORRECTION

PATENT NO. : 4,792,492

DATED : December 20, 1988

INVENTOR(S) : Gim F. Lee, Jr.

It is certified that error appears in the above-identified patent and that said Letters Patent is hereby corrected as shown below:

"ceramiss", column 1, line 12, should properly read as "ceramics";

"artccle", column 1, line 24, should properly read as "article";

"the" (first occurence), column 2, line 30, should properly read as "be";

"immession", column 2, line 48, should properly read as "immersion";

"butadienestyrene", column 2, line 64, should be hyphenated between "ene" and "sty";

"diphenyphenol", column 3, line 24, should properly read as "diphenylphenol";

"(2-methyl6-cyclohexyl)", column 3, line 35, should be hyphenated between "methyl" and "6";

"thylco", column 3, line 47, should properly read as "thy-co";

"add", column 5, line 45, should properly read as "and";

"polyphenylelne", column 6, line 30, should properly read as "polyphenylene";

"oen", column 6, line 37, should properly read as "one";

"lwoer", column 6, line 52, should properly read as "lower";

"inot", column 8, line 28, should properly read as "into";

UNITED STATES PATENT AND TRADEMARK OFFICE
CERTIFICATE OF CORRECTION

PATENT NO. : 4,792,492

DATED : December 20, 1988

INVENTOR(S) : Gim F. Lee, Jr.

It is certified that error appears in the above-identified patent and that said Letters Patent is hereby corrected as shown below:

In Claim 21, line 1, delete "of" and insert "or";

In Claim 21, line 2, delete "20" and insert "19"; and

In Claim 24, line 1, delete "A" and insert "An".

Signed and Sealed this

Twenty-second Day of August, 1989

*Attest:*

DONALD J. QUIGG

*Attesting Officer*  *Commissioner of Patents and Trademarks*